(12) United States Patent
Hamashita et al.

(10) Patent No.: US 11,526,674 B2
(45) Date of Patent: Dec. 13, 2022

(54) SENTENCE EXTRACTION SYSTEM, SENTENCE EXTRACTION METHOD, AND INFORMATION STORAGE MEDIUM

(71) Applicant: RAKUTEN GROUP, INC., Tokyo (JP)

(72) Inventors: Masakatsu Hamashita, Tsukuba (JP); Takashi Inui, Tsukuba (JP); Koji Murakami, Eastchester, NY (US)

(73) Assignee: RAKUTEN GROUP, INC., Tokyo (JP)

(*) Notice: Subject to any disclaimer, the term of this patent is extended or adjusted under 35 U.S.C. 154(b) by 819 days.

(21) Appl. No.: 16/289,664

(22) Filed: Mar. 1, 2019

(65) Prior Publication Data

US 2020/0279018 A1 Sep. 3, 2020

(51) Int. Cl.
  *G06F 40/30* (2020.01)
(52) U.S. Cl.
  CPC .................. *G06F 40/30* (2020.01)
(58) Field of Classification Search
  CPC ...... G06F 40/30; G10L 15/22; G10L 15/1815
  See application file for complete search history.

(56) References Cited

U.S. PATENT DOCUMENTS

| 9,865,260 | B1* | 1/2018 | Vuskovic | G06F 40/295 |
| 2004/0170327 | A1* | 9/2004 | Kim | G06V 20/40 |
| | | | | 356/613 |
| 2005/0187932 | A1* | 8/2005 | Kanayama | G06F 40/30 |
| 2012/0310950 | A1* | 12/2012 | Ishikawa | G06Q 10/10 |
| | | | | 707/E17.058 |
| 2016/0034458 | A1* | 2/2016 | Choi | G10L 15/06 |
| | | | | 704/251 |
| 2017/0060365 | A1* | 3/2017 | VanBlon | G06F 40/30 |
| 2018/0039633 | A1* | 2/2018 | Miyoshi | G06F 40/247 |
| 2019/0180343 | A1* | 6/2019 | Arnett | G06Q 30/0633 |
| 2019/0205388 | A1* | 7/2019 | Otaki | G06F 40/30 |
| 2019/0355352 | A1* | 11/2019 | Kane | G06K 9/00832 |
| 2020/0042644 | A1* | 2/2020 | Jagan | G06N 3/0445 |
| 2020/0357396 | A1* | 11/2020 | Fujii | F24F 11/88 |
| 2021/0286949 | A1* | 9/2021 | Hashimoto | G06F 16/245 |

FOREIGN PATENT DOCUMENTS

| CN | 109460450 A | * | 3/2019 | | |
| JP | 2015219441 A | * | 12/2015 | ............. | G06F 3/013 |
| JP | 2017-027233 A | | 2/2017 | | |
| KR | 20200013298 A | * | 2/2020 | ............. | G06F 3/013 |

(Continued)

OTHER PUBLICATIONS

KR-102247533-B1 translation (Year: 2014).*

(Continued)

*Primary Examiner* — Michelle M Koeth
*Assistant Examiner* — Darioush Agahi
(74) *Attorney, Agent, or Firm* — HEA Law PLLC

(57) ABSTRACT

A text extracting system includes at least one processor configured to obtain a plurality of texts, specify at least one characteristic expression included in the plurality of texts, and extract, based on the at least one characteristic expression, at least one text to be entered into a question sentence generator from the plurality of texts, where the question sentence generator generating a question sentence from an input sentence.

19 Claims, 9 Drawing Sheets

(56) References Cited

FOREIGN PATENT DOCUMENTS

| KR | 102247533 B1 | * | 5/2021 | ............. G10L 15/06 |
|---|---|---|---|---|
| WO | WO-2006093003 A1 | * | 9/2006 | ......... H04N 21/8405 |
| WO | 2016135906 A1 | | 9/2016 | |

OTHER PUBLICATIONS

CN109460450A—translation (Year: 2018).*
W02006093003A1—Translation (Year: 2005).*
JP2015219441A—Translation (Year: 2015).*
KR20200013298A—Translation (Year: 2018).*
Office Action dated Mar. 24, 2020, for corresponding JP Patent Application No. 2019-183761 with partial translation.
Koichiro Yoshino, et al., "Language Modeling for Spoken Dialogue System based on Sentence Transformation and Filtering using Predicate-Argument Structure", Information Processing Society of Japan Technical Report 2012, Japan Information Processing Society, Jun. 15, 2012, pp. 1-5 (See English abstract and partial translation of the Office Action).
Masakatsu Hashimoto, et al. "Effect of Inserting Negative Speech on Question Generation for Interactive Information Gathering", The Association for Natural Language Processing, Presentations at the 24 Annual Meeting of the Japan Society for Language Processsing, Mar. 5, 2018, pp. 544-547, URL, http://www.anlp.jp/proceedingsannual_meeting/2018/pdf_dir/P4-15.pdf (See partial translation of the Office Action).

* cited by examiner

FIG.3

| MODEL | NUMBER OF EXTRACT SENTENCES | EXTRACTION PRECISION | NUMBER OF DIFFERENT OPINIONS | NUMBER OF WORDS /SENTENCE |
|---|---|---|---|---|
| MODEL A | 14 | 0.857 | 14 | 24.8 |
| MODEL B | 22 | 0.727 | 48 | 38.3 |
| MODEL C | 14 | 0.857 | 14 | 24.8 |
| MODEL D | 45 | 0.556 | 146 | 42.5 |

| OBJECT ID | ATTRIBUTE | NAME | TEXT |
|---|---|---|---|
| t00001 | ATTRIBUTE X | CONTENT A | THANK YOU AS ALWAYS. |
| | | | IT IS A SONG OF REFRESHING SINGING VOICE. |
| t00002 | ATTRIBUTE X | CONTENT B | IN PARTICULAR, THE MAIN VOCAL IS IMPRESSIVELY CLEAR AND CRISP, AND THE RHYTHMICAL CHORUS IS BALANCED VERY WELL AND FUN. |
| | | | I THINK I'M GOING TO WATCH AGAIN. |
| t00003 | ATTRIBUTE X | CONTENT C | BY THE WAY, THE MEMBERS ARE DIFFERENT FROM THE LAST YEAR'S, RIGHT? |
| ⋮ | ⋮ | ⋮ | ⋮ |

FIG.6

| EVALUATION VIEWPOINT | EVALUATION EXPRESSION |
|---|---|
| SINGING VOICE | REFRESHING |
| BALANCE | GOOD |
| MAIN VOCAL | CLEAR |
| CHORUS | RHYTHMICAL |
| MEMBER | FUN |
| . | . |
| . | . |
| . | . |

| ATTRIBUTE | QUESTION SENTENCE |
|---|---|
| ATTRIBUTE X | IS IT A SONG OF REFRESHING SINGING VOICE? |
| ATTRIBUTE X | HOW IS SINGING VOICE OF THE SONG? |
| ATTRIBUTE X | DO YOU THINK YOU ARE GOING TO WATCH AGAIN? |
| ... | ... |

DB3

SENTENCE EXTRACTION SYSTEM, SENTENCE EXTRACTION METHOD, AND INFORMATION STORAGE MEDIUM

TECHNICAL FIELD

The present invention relates to a text extracting system, a text extracting method, and an information storage medium.

BACKGROUND ART

In the field of natural language processing, a technique of analyzing text has been studied. For example, Patent Literature 1 describes a computer that prepares a template in which a part of a question sentence is blank, and, when an input sentence is entered into the question sentence generator for generating a question sentence from an input sentence, inserts words included in the input sentence into the blank of the template, thereby generating a question sentence.

CITATION LIST

Patent Literature

Patent Literature 1: JP2017-27233A

SUMMARY OF INVENTION

Technical Problem

However, while a lot of input sentences are entered into the question sentence generator, not all of the input sentences include a characteristic expression suitable for generating a question sentence. In Patent Literature 1, the words included in the input sentence are simply inserted into the blank part of the template. As such, when an input sentence that does not include a characteristic expression is entered, the question sentence generator generates a question sentence that is unclear about what is asked. Consequently, accuracy of the question sentence has not been fully enhanced.

One or more embodiments of the present invention have been conceived in view of the above, and an object thereof is to provide a text extracting system, a text extracting method, and an information storage medium capable of increasing accuracy of a question sentence that a question sentence generator generates.

Solution to Problem

In order to solve the above described problems, a text extracting system according to the present invention includes at least one processor configured to obtain a plurality of texts, specify at least one characteristic expression included in the plurality of texts, and extract, based on the at least one characteristic expression, at least one text to be entered into a question sentence generator from the plurality of texts, where the question sentence generator generating a question sentence from an input sentence.

A text extracting method according to the present invention includes obtaining a plurality of texts, specifying at least one characteristic expression included in the plurality of texts, and extracting, based on the at least one characteristic expression, at least one text to be entered into a question sentence generator from the plurality of texts, where the question sentence generator generates a question sentence from an input sentence.

A non-transitory information storage medium according to the present invention stores a program that causes a computer to obtain a plurality of texts, specify at least one characteristic expression included in the plurality of texts, and extract, based on the at least one characteristic expression, at least one text to be entered into a question sentence generator from the plurality of texts, where the question sentence generator generates a question sentence from an input sentence.

In one aspect of the present invention, the text extracting system further includes a memory that stores the question sentence generator, and the at least one processor is further configured to input the at least one text in the question sentence generator and obtain at least one question sentence generated by the question sentence generator.

In one aspect of the present invention, the at least one processor is further configured to specify a plurality of characteristic expressions included in the plurality of texts, and extract the at least one text in such a way that a more number of characteristic expressions are included in the overall extracted texts.

In one aspect of the present invention, the at least one processor is further configured to specify a plurality of characteristic expressions included in the plurality of texts, determine, based on a predetermined condition, at least one characteristic expression to be used for text extraction from the plurality of characteristic expressions, and extract the at least one text including the at least one determined characteristic expression.

In one aspect of the present invention, the at least one processor is further configured to extract the at least one text in such a way that an amount of the text to be extracted is within a predetermined range.

In one aspect of the present invention, the at least one processor is further configured to obtain occurrence probability of the at least one characteristic expression, and extract the at least one text based on the occurrence probability.

In one aspect of the present invention, the at least one processor is further configured to obtain a dependency distance of the at least one characteristic expression, and extract the at least one text based on the dependency distance.

In one aspect of the present invention, the at least one processor is further configured to extract, from the plurality of texts, at least one text which includes the at least one characteristic expression, and in which a number of the at least one characteristic expressions matches with a number of at least one dependency word.

In one aspect of the present invention, the at least one processor is further configured to extract, from the plurality of texts, at least one text which includes the at least one characteristic expression, and in which a number of the at least one dependency word of the at least one characteristic expression is within a predetermined range.

In one aspect of the present invention, the at least one processor is further configured to extract, from the plurality of texts, at least one text which includes the at least one characteristic expression, and in which a number of the at least one characteristic expression is within a predetermined range.

In one aspect of the present invention, the at least one processor is further configured to extract the at least one text in such a way that a number of the extracted texts that include a same characteristic expression is within a predetermined range.

In one aspect of the present invention, each of the plurality of texts is a review of an evaluation object, the at least one characteristic expression indicates a feature of the evaluation object, and the question sentence is a text that prompts a user to input a review.

In one aspect of the present invention, the evaluation object belongs to at least one of a plurality of attributes, and the at least one processor is further configured to obtain a plurality of reviews for each of the plurality of attributes, specify at least one characteristic expression for each of the plurality of attributes, and extract at least one review from the plurality of reviews for each of the plurality of attributes.

In one aspect of the present invention, each of the plurality of texts to be obtained includes at least one sentence, and each of the at least one text to be extracted is any one of the sentences included in the plurality of texts.

Effects of the Invention

According to the present invention, accuracy of a question sentence that a question sentence generator generates can be increased.

BRIEF DESCRIPTION OF THE DRAWINGS

FIG. 3 is a diagram illustrating results of the experiment conducted by the inventors;

FIG. 5 is a diagram illustrating an example of data storage of a text database;

FIG. 6 is a diagram illustrating an example of data storage of a dictionary database;

FIG. 7 is a diagram illustrating an example of data storage of a question sentence database;

DESCRIPTION OF EMBODIMENTS

[Overall Configuration of Text Extracting System]

Figure 1:
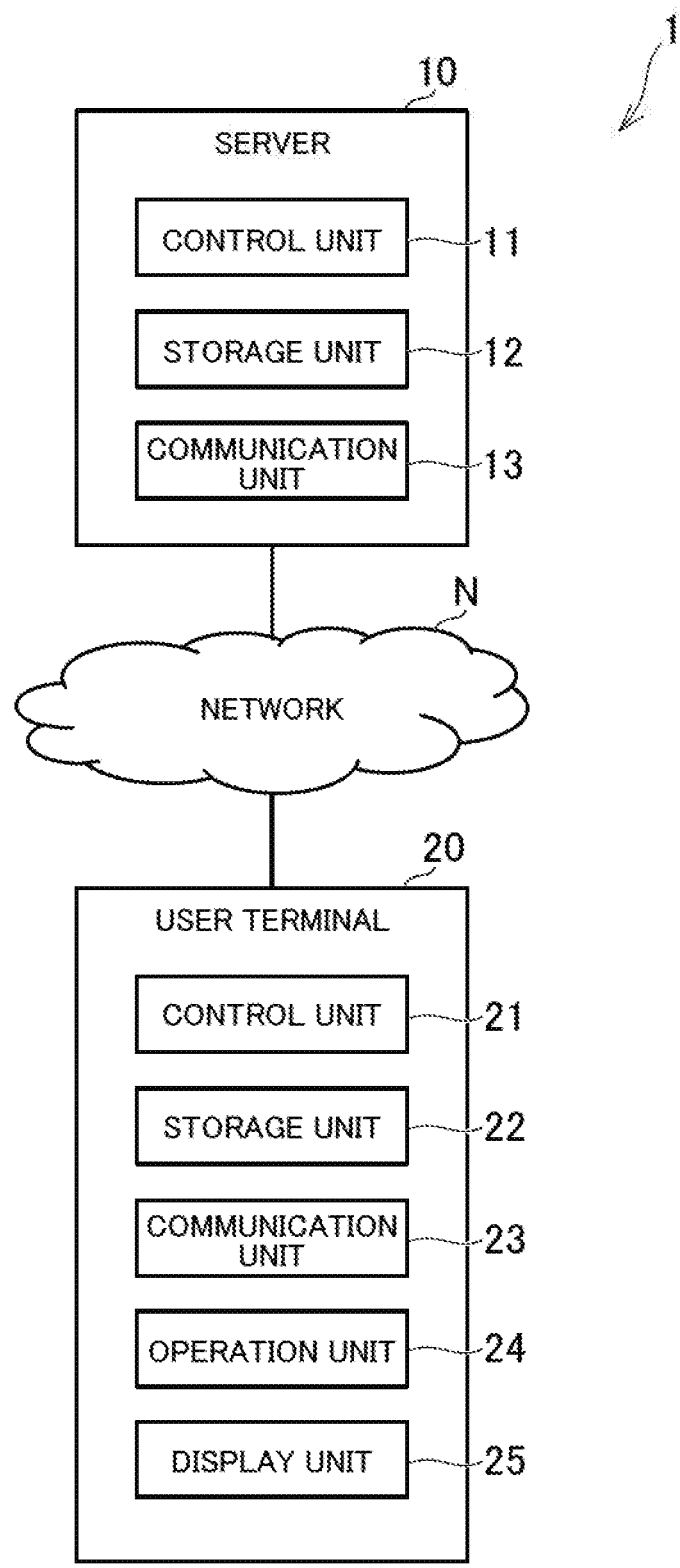
FIG. 1 is a diagram illustrating an overall configuration of a text extracting system.

An embodiment of the text extracting system according to the present invention will be described below. FIG. 1 is a diagram illustrating an overall configuration of the text extracting system. As shown in FIG. 1, the text extracting system 1 includes a server 10 and a user terminal 20, each connected to a network N such as the Internet. FIG. 1 shows one server 10 and one user terminal 20, although the number of each of them may be two or more.

The server 10 is a server computer and includes a control unit 11, a storage unit 12, and a communication unit 13, for example. The control unit 11 includes at least one processor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a hard disk and a flash memory. The communication unit 13 includes a wired or wireless communication interface for data communications through the network N, for example.

The user terminal 20 is a computer operated by a user, such as a personal computer, a portable information terminal (including a tablet computer), and a mobile phone (including a smartphone). The user terminal 20 includes a control unit 21, a storage unit 22, a communication unit 23, an operation unit 24, and a display unit 25. The hardware configuration of the control unit 21, the storage unit 22, and the communication unit 23 may be the same as the hardware configuration of the control unit 11, the storage unit 12, and the communication unit 13. The operation unit 24 is an input device, for example, a pointing device such as a touch panel and a mouse, and a keyboard. The operation unit 24 transmits an operation of a user to the control unit 21. The display unit 25 is, for example, a liquid crystal display unit or an organic EL display unit.

The programs and data described as being stored in the storage units 12 and 22 may be provided to these units through a network. The hardware configuration of the server 10 and the user terminal 20 is not limited to the above examples, and can adopt various types of hardware. For example, the server 10 and the user terminal 20 may each include a reader (e.g., optical disc drive and memory card slot) for reading a computer-readable information storage medium, and an input/output unit (e.g., USB port) for directly connecting to external devices. In this case, the programs and data stored in the information storage medium may be provided to each of the server 10 and the user terminal 20 through the reader or the input/output unit.

[2. Overview of Text Extracting System]

The text extracting system 1 extracts at least one text to be entered into a question sentence generator from a plurality of texts.

A text is a collection of information including a character string. The text may include one sentence or a plurality of sentences. A sentence indicates a series of words that ends with (separated by) a period, an exclamation mark, or a question mark. In this embodiment, when a text includes only one sentence, the text and the sentence have the same meaning. When a text includes a plurality of sentences, the text means all of these sentences. A text may be written in any language, such as English, Japanese, Chinese, Spanish, French, and Arabic. Further, a text includes any content, such as SNS posting, message board posting, comments on a video or an article, a review on a product or a service, and a message for an e-mail or a message application. In this embodiment, the server 10 stores a large number of texts entered by a large number of users, and some of the texts are entered into the question sentence generator. As such, the text may be also described as a candidate of an input sentence.

The question sentence generator is a program (application) for generating a question sentence based on an input sentence. In other words, the question sentence generator is a paraphrasing processing program specific for question sentence converting, or an algorithm that defines a method of generating a question sentence. The question sentence generator may use a known generator. For example, a technique using a statistical machine translation method or a neural machine translation method (technique according to the thesis of L. Nio and K. Murakami, "Intelligence is Asking the Right Question: A Study on Japanese Question Generation" IEEE Spoken Language Technology conference, 2018, or "U.S. patent application Ser. No. 16/228, 594") may be used, or a rule-based method or a semi-rulebased method that predetermines a rule for converting an input sentence into a question sentence may be used.

An input sentence is a text to be entered in the question sentence generator. In other words, the input sentence is a text to be converted into a question sentence. The text extracting system 1 extracts, from a plurality of texts, at least one text to be an input sentence. As such, the input sentence may be also described as a text after being extracted (filtered). The input sentence may be any sentence other than a question sentence, such as a declarative sentence, an exclamatory sentence, and an imperative sentence. The input sentence may be a positive sentence or a negative sentence.

A question sentence is in a form to ask someone a question. In other words, the question sentence is a text obtained by converting an input sentence. The question sentence may be referred to as a query sentence. The question sentence may be in any format, such as a YN-question sentence (question sentence that can be answered by yes or no), a WH-question sentence (question sentence that begins with a wh-word, such as What, Which, Why, and Where, or How), a choice question sentence, a tag question sentence, and an indirect question sentence. The question sentence may end with a question mark, such as "?", or a question mark may be omitted. Types of the question sentences may not be limited to above described examples, and may include any types in accordance with the corresponding languages of the question sentence generator.

In this embodiment, a case will be described in which a comment of a user on content, such as a video and an article, corresponds to a text. The comment includes the user's thoughts on the content, and thus a question sentence generated by the question sentence generator is a text that prompts the user to enter thoughts on the content. The question sentence may be presented to a user who has not entered a comment, or to a user who has entered a comment so as to ask another comment.

For example, users input comments through SNS and websites. The comments entered by users may include useful information, but many of them include just a brief comment, which provides very few information. As such, in this embodiment, in order to actively encouraging users to enter comments instead of passively waiting for their comments, a question sentence is generated in a way to collect more number of comments.

In this regard, the method described in the Background Art for generating a question sentence using a template depends on the number of templates for the question sentence variations. As such, the question sentences lack expressiveness, and are unable to collect various thoughts of users. Accordingly, it is preferable to use a variety of question sentence generators without limiting to the method using the template.

However, there are many comments that are not suitable for generating a question sentence, for example, greetings and gratitude in which user's thoughts are not included. As such, if a comment that is not suitable for generating a question sentence is entered into the question sentence generator, a question sentence that is unclear about what is asked is generated. This reduces accuracy of the question sentence. The text extracting system 1 thus extracts a comment suitable for generating a question sentence from the comments, thereby increasing accuracy of the question sentence.

Figure 2:
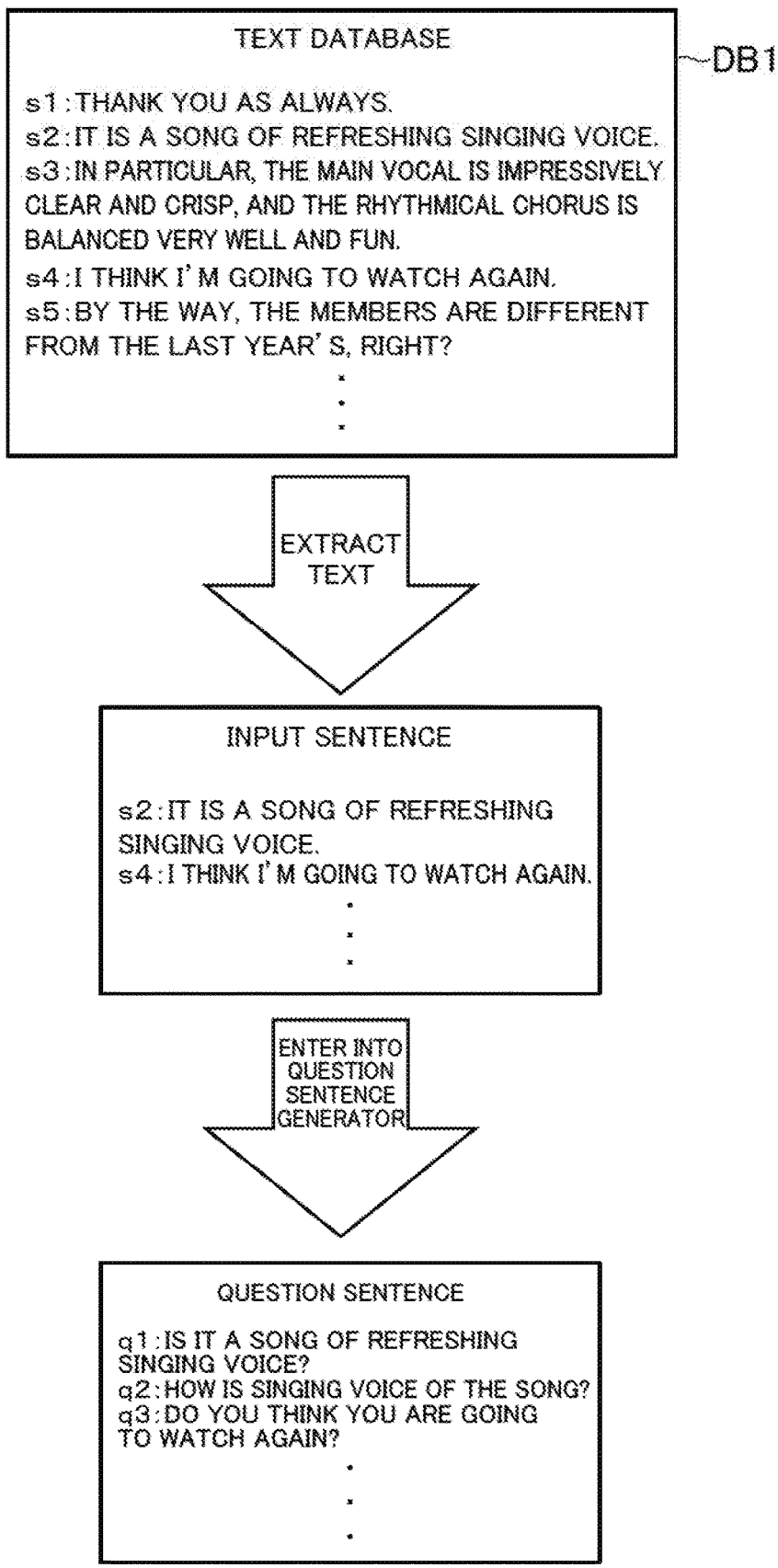
FIG. 2 is a diagram illustrating an overview of the processing executed by the text extracting system.

FIG. 2 is a diagram illustrating an overview of the processing executed by the text extracting system. For example, the server 10 stores a text database DB1 in which a large number of comments are stored. A comment including only greetings and gratitude, such as a comment s1, does not include a user's thoughts, and thus is not suitable for generating a question sentence. For example, even if a comment includes a user's thoughts as a comment s3, a long comment including multiple matters is difficult to be converted into a question sentence, and thus not suitable for generating a question sentence. Further, for example, even if a comment is easily converted into a question sentence like a comment s5, if the comment fails to express the user's thoughts, it is not suitable for generating a question sentence.

On the other hand, comments s2 and s4 are successful in expressing the user's thoughts, and, the thoughts are plainly described, and thus suitable for generating a question sentence. For example, as shown in FIG. 2, the comments s1, s3, and s5 are eliminated, and the comments s2 and s4 are entered into the question sentence generator. This helps to generate a question sentence that is highly accurate and can elicit a user's thoughts as seen in the question sentences q1 to q3. As described above, the text extracting system 1 eliminates the comments that are not suitable for generating a question sentence, and extracts the comments suitable for generating a question sentence and enter the extracted comments into the question sentence generator.

[3. An Example of Method of Extracting Input Sentence]

In this embodiment, as an example of a method of extracting an input sentence, sentence extraction according to Integer Linear Programming problem (hereinafter ILP based sentence extraction) will be described. For example, in the ILP based sentence extraction, a sentence set $D = \{s_1, \ldots, s_N\}$ (N: an integer of 2 or more) is provided as an input. The sentence set D is a set of comments that the text extracting system 1 obtains first, and a population from which an input sentence is extracted. The ILP based sentence extraction is perceived as a problem of forming a proper subset $S \subseteq D$ from the sentence set D.

Here, in a case where the input sentence set is represented by $y = \{y_1, \ldots, y_N\}$, which is a 0/1 vector of dimension N, $y_i = 1$ when a sentence $s_i$ (i: an integer of 1 to N) included in the sentence set D is $s_i \in S$. If not, a result of the sentence extraction can be represented by a vector with $y_i = 0$.

In this embodiment, a basic model of the ILP based sentence extraction is defined as numerical expressions 1 and 2 below. In this regard, numerical expression 3 indicates that a value of $y_i$ in numerical expression 2 is 0 or 1.

$$y^* = \arg\max_y f(y) \qquad \text{[numerical expression 1]}$$

$$\text{s.t.} \sum_{i=1}^{N} l_i y_i \leq L_{max} \qquad \text{[numerical expression 2]}$$

$$\forall i, y_i \in \{0, 1\} \qquad \text{[numerical expression 3]}$$

In the numerical expression 1, a function $f(y)$ is an evaluation function that evaluates how good an output candidate y is. This embodiment aims to output a candidate with the largest value of a function $f(y)$ while satisfying a constraint expression of the numerical expression 2. Here, $L_{max}$ in the constraint expression of the numerical expression 2 is the maximum length of an output, and $l_i$ indicates a length of a sentence $s_i$. That is, the numerical expression 2 imposes a constraint so that an amount of an entire output sentence may not be too much. In the ILP based sentence extraction, a sentence extractor suitable for a certain purpose can be designed by defining a function f (y) and adding a constraint expression.

In this embodiment, a sentence extractor is required: a) to preferentially extract a sentence including an opinion, b) to preferentially extract a structurally and semantically simple sentence, and c) to extract a sentence so as to include a variety of opinions in a sentence set as a whole to be output. The opinion is thoughts of a user, and, as described later, in this embodiment, defined as a pair of an evaluation viewpoint $a_j$ and an evaluation expression $e_k$.

For example, according to the requirement a), the comment s1 and the comment s5 in FIG. 2 can be eliminated. For example, according to the requirement b), the comment s3 can be eliminated. For example, according to the requirement c), opinion variations can be increased, and expressiveness of comments to be output can be improved.

In this embodiment, as a sentence extraction model that satisfies all of the requirements a) to c), an evaluation function is defined as numerical expression 4.

$$f(y) = \sum_{j=1}^{|Q_a|} \sum_{k=1}^{|Q_e|} \frac{b_{jk}}{d_{jk}} z_{jk} \quad \text{[numerical expression 4]}$$

Further, using the evaluation function of the numerical expression 4, the basic model defined in the numerical expression 1 and the numerical expression 2 is extended as represented in numerical expression 5 to numerical expression 8. The value of $y_i$ in the numerical expression 5 to the numerical expression 8 is 0 or 1 as indicated in the numerical expression 3. Further, numerical expression 9 indicates that a value of $z_{jk}$ in the numerical expression 4 and the numerical expression 8 is 0 or 1.

$$\forall i, \sum_{j=1}^{|Q_a|} c_a(y_i, a_j) = \sum_{k=1}^{|Q_e|} c_e(y_i, e_k) \quad \text{[numerical expression 5]}$$

$$\forall i, \sum_{j=1}^{|Q_a|} c_a(y_i, a_j) \leq 1 \quad \text{[numerical expression 6]}$$

$$\forall i, \sum_{k=1}^{|Q_e|} c_e(y_i, e_k) \leq \quad \text{[numerical expression 7]}$$

$$\forall j, k, z_{jk} \leq \sum_{i=1}^{N} o_{ijk} y_i \quad \text{[numerical expression 8]}$$

$$\forall j, k, z_{jk} \in \{0, 1\} \quad \text{[numerical expression 9]}$$

The evaluation function of the numerical expression 4 will be described. In this embodiment, an opinion included in a comment is defined as a pair of an evaluation viewpoint $a_j$ and an evaluation expression $e_k$. The evaluation viewpoint $a_j$ is a part to be specifically evaluated or an attribute of an evaluation object (in this embodiment, content to which a comment is posted), for example, words and phrases such as "singing voice" and "balance." The evaluation viewpoint $a_j$ can be also described as a point of view of evaluation. The evaluation expression $e_k$ is language expression for evaluating an evaluation object, for example, words and phrases such as "fresh" and "good." The evaluation expression $e_k$ is specific content of evaluation, and here indicates a user's subjective opinion. The evaluation viewpoint $a_j$ and the evaluation expression $e_k$ may be a word, or a phrase including a plurality of words. The evaluation viewpoint $a_j$ and the evaluation expression $e_k$ may be prepared in advance, and may be determined not to use negative wording, for example.

In the numerical expression 4, a set of evaluation viewpoints $a_j$ is $Q_a$, and a set of evaluation expressions $e_k$ is $Q_e$. A variable $z_{jk}$ in the numerical expression 4 is 1 when an opinion $<a_j, e_k>$ (a pair of an evaluation viewpoint $a_j$ and an evaluation expression $e_k$) is included in an output, and 0 when they are not included in an output. As indicated in the right side of the numerical expression 4, a value of the evaluation function increases as an output includes more variety of opinions by adding a value, which is obtained by multiplying a variable $z_{jk}$ by a weight described later, to each of all the opinions. As such, the numerical expression 4 can be described as an expression for enriching opinion variations included in question sentences to be extracted.

Here, $b_{jk}/d_{jk}$ in the numerical expression 4 represents a weight to an opinion $<a_j, e_k>$. A numerator $b_{jk}$ is occurrence probability of an opinion $<a_j, e_k>$ in comments. The occurrence probability is a measure of a standard way of expressing something. When a certain way of expression has higher occurrence probability, such an expression is considered to be more frequently used in general and understandable for everyone. The occurrence probability may be determined in advance, or obtained by analyzing overall comments statistically.

A denominator $d_{jk}$ is an average dependency distance between an evaluation viewpoint $a_j$ and an evaluation expression $e_k$, which are elements of an opinion, in a sentence. A dependency distance is a value represents how far an evaluation viewpoint $a_j$ and an evaluation expression $e_k$ are apart from each other, for example, the number of words between the evaluation viewpoint $a_j$ and the evaluation expression $e_k$.

In the numerical expression 4, with the use of the weight of $b_{jk}/d_{jk}$, an opinion having a standard way of expression that is frequently used and including an evaluation viewpoint $a_j$ and an evaluation expression $e_k$ close to each other (i.e., structurally simple opinion) is preferentially extracted.

Next, the numerical expression 5 to the numerical expression 8, which are constraint expressions extended from the basic model, will be described. For example, a function $c_a (y_i, a_j)$ in the constraint expression of the numerical expression 5 is defined as follows:

$$\sum_{i=1}^{N} h_{ij} y_i \quad \text{[numerical expression 10]}$$

In the numerical expression 10, $h_{ij}$ is 1 if a sentence $s_i$ includes an evaluation viewpoint $a_j$. If not, $h_{ij}$ is 0. That is, $c_a (y, a_j)$ represents how many sentences including the evaluation viewpoint $a_j$ are output. Here, a vector $y_i$ is a vector with values other than $y_i$ of the output candidate y being 0. As a result, $c_a (y_i, a_j)$ is 1 if the sentence $s_i$ does not include an evaluation viewpoint $a_j$. If not, $c_a (y_i, a_j)$ is 0. The left side of the numerical expression 5 represents the number of different evaluation viewpoints $a_j$ included in $s_i$. Similarly, the right side of the numerical expression 5 represents the number of different evaluation expressions $e_k$ included in $s_i$. As a conclusion, in order that the sentence $s_i$ is included in an output, the constraint expression in the numerical expression 5 defines that the number of different evaluation viewpoints $a_j$ and the number of evaluation expressions $e_k$ included in the sentence $s_i$ should be the same (an evaluation viewpoint $a_j$ and an evaluation expression $e_k$ appear as a pair and constitutes an opinion).

The constraint expression in the numerical expression 6 and the constraint expression in the numerical expression 7 define that such a number is at most one. These two constraints require an opinion to be expressed in a simple manner when a sentence including the opinion is extracted.

The constraint expression in the numerical expression 8 is a relational expression for maintaining the consistency between a variable $y_i$ regarding an output of a sentence $s_i$ and a variable $z_{jk}$ regarding an opinion included in the output. In the relational expression, $o_{ijk}$ is 1 if the sentence $s_i$ includes an opinion $<a_j, e_k>$, and if not, $o_{ijk}$ is 0. That is, in order that the output includes an opinion $<a_j, e_k>$, one or more sentences including $<a_j, e_k>$ should be output.

In accordance with the ILP based sentence extraction described above, the sentence extraction system S in this embodiment extracts a comment suitable for generating a question sentence from comments stored in the server 10. The sentence extraction system S may use all of the constraint expressions described above, or only a part of them. For example, the sentence extraction system S may use both or only one of the constraint expression included in the numerical expression 5, which controls an opinion included in an output sentence, and the constraint expression indicated in the numerical expression 6 and the numerical expression 7 (the constraint expressions used in a pair in the numerical expression 6 and the numerical expression 7).

FIG. 3 is a diagram illustrating results of the experiment conducted by the inventors. The results indicate that the experiment was not conducted for comments on the content described in this embodiment, but conducted for reviews of a specific product. This experiment was conducted for about 700 reviews, and the maximum output length $L_{max}$ is set to be about a summarization rate of 5%, although an amount of texts and a summarization rate of the population are not limited to this example.

"Model A" in FIG. 3 uses both the constraint expression indicated in the numerical expression 5 and the constraint expression indicated in the numerical expression 6 and the numerical expression 7. "Model B" uses the constraint expression indicated in the numerical expression 5, and does not use the constraint expression indicated in the numerical expression 6 and the numerical expression 7. "Model C" does not use the constraint expression indicated in the numerical expression 5, and uses the constraint expression indicated in the numerical expression 6 and the numerical expression 7. "Model D" does not use either the constraint expression indicated in the numerical expression 5 or the constraint expression indicated in the numerical expression 6 and the numerical expression 7. "Number of extract sentences" in FIG. 3 is the number of sentences extracted from the population by each model. "Extraction precision" indicates a ratio that each model extracts sentences that should be extracted (sentences that appear to be suitable for generating a question sentence). "Number of different opinions" is opinion variations. "Number of words/sentence" is an average number of words in a sentence.

As shown in FIG. 3, the results of the experiment by the inventors confirmed that the comment including the user's opinion satisfying the requirement a) can be extracted by the ILP based sentence extraction described above. Further, the output results are greatly different between the model A, which uses both the constraint expression indicated in the numerical expression 5 and the constraint expression indicated in the numerical expression 6 and the numerical expression 7, and the model D using none of them. The model B using only the constraint expression indicated in the numerical expression 5 is in-between, and, in this experiment, the model C using only the constraint expression indicated in the numerical expression 6 and the numerical expression 7 had the same result with the model A using both the constraint expressions. In the following, the result of the model A using both the constraint expressions and the model D using none of them will be compared.

Referring to the extraction precision, the model A shows a high value, and extracts more comments suitable for generating a question sentence than the model D. The model D has more number of different opinions than the model A. This is because, as can be seen from the number of words in a sentence, the model D selected the long comment and preferentially output the sentence including a plurality of opinions so as to increase the evaluation function value. This matches the requirement c), but does not match the requirement b).

On the other hand, the model A indicated an opposite tendency, and preferentially output the short sentence including one opinion due to a constraint expression in each of the numerical expression 5 to the numerical expression 7. In the model A, a length of the extracted sentence was short, and thus the number of the extracted sentences was expected to be greater than the model D, but the experiment showed the opposite result. This is because only few sentences satisfying the constraint of the model A were included in the data set used in the experiment, and were not output close to the $L_{max}$ limit. If sentences satisfying the constraints are included in inputs, the number of extracted sentences is expected to increase, and the number of extracted different opinions is also expected to increase accordingly.

As described above, the sentence extraction system S in this embodiment does not input all of the comments in the question sentence generator, but narrow the comments to those suitable for generating a question sentence, thereby increasing accuracy of a question sentence to be generated by the question sentence generator. In the following, features of the text extracting system 1 will be described in details below.

[4. Functions Implemented in This Embodiment]

Figure 4:
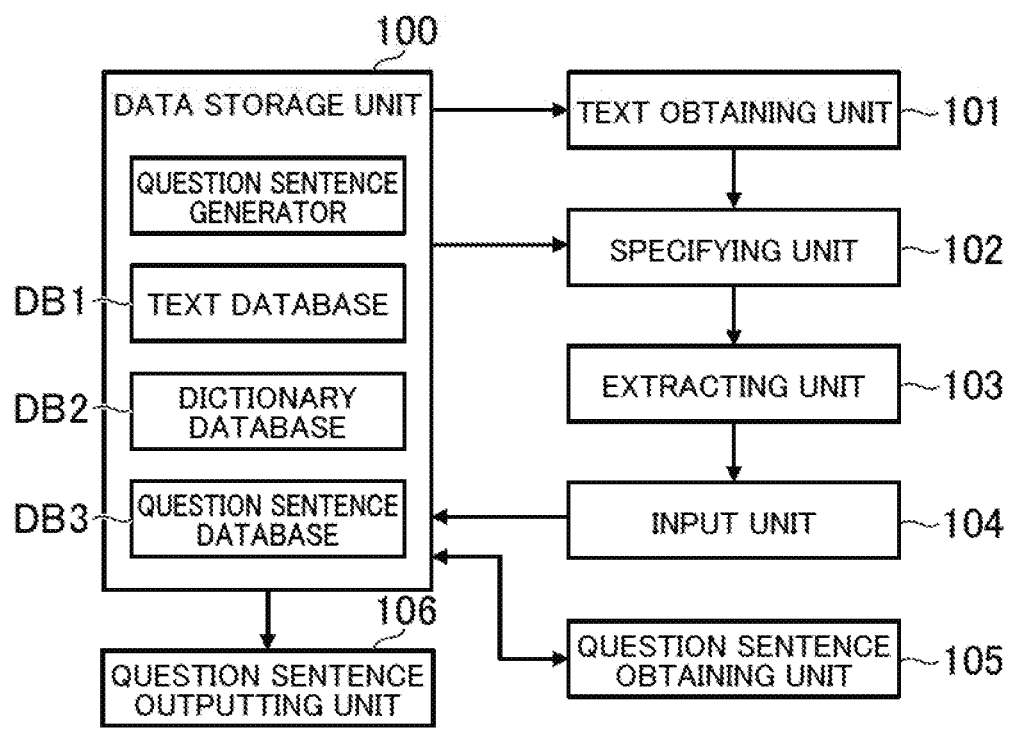
FIG. 4 is a functional block diagram showing an example of functions implemented in the text extracting system.

FIG. 4 is a functional block diagram showing an example of functions implemented in the text extracting system 1. As shown in FIG. 4, for example, a data storage unit 100, a text obtaining unit 101, a specifying unit 102, an extracting unit 103, an input unit 104, a question sentence obtaining unit 105, and a question sentence outputting unit 106 are implemented. In this embodiment, these functions are implemented by the server 10. The data storage unit 100 is implemented mainly by the storage unit 12, and other functions are implemented mainly by the control unit 11.

[4-1. Data Storage Unit]

The data storage unit 100 may store data necessary for extracting texts. For example, the data storage unit 100 stores a question sentence generator, a text database DB1, a dictionary database DB2, and a question sentence database DB3. In FIG. 4, a reference sign of the question sentence generator is omitted.

As described above, the question sentence generator may use various known methods, and the data storage unit 100 stores data of the question sentence generator, such as programs and parameters. For example, in a case where a machine translation method is used, the data storage unit 100 stores, as a question sentence generator, a model in which parameters are adjusted by training data indicating relationship between input sentences and question sentences. For example, the training data is created by human by converting an input sentence into a question sentence and storing a pair of the input sentence and the question sentence in the training data.

For example, if a rule-based method or a semi-rule-based method is used, the data storage unit 100 stores a question sentence generator having a conversion rule for converting an input sentence into a question sentence. The conversion rule is relationship between an input sentence and a question sentence and includes, for example, rules for rearrangement of words and an insert position of an interrogative. The conversion rule may be manually specified by human according to languages. As another example, if a template is used, the data storage unit 100 stores a question sentence generator including templates. Some of words in an input sentence can be inserted into a template, and a question sentence is generated by inserting a characteristic expression of the input sentence into the template.

FIG. 5 is a diagram illustrating an example of data storage of the text database DB1. As shown in FIG. 5, the text database DB1 stores a plurality of texts. For example, the text database DB1 stores an object ID for uniquely identifying an evaluation object, an attribute of the evaluation object, a name of the evaluation object, and comments entered by users.

In this embodiment, a comment is entered with respect to content, and thus an evaluation object is content, and an object ID is information for uniquely identifying content. The evaluation object may also be described as an object for which a comment is entered. The attribute is classification of evaluation objects, and also referred to as a category or a genre. In a case where an object is content as in this embodiment, the attribute is classification of content, such as "comedy", "horror", and "education." The attribute is specified when content is registered. In this embodiment, an evaluation object is described as belonging to at least one of attributes, although the evaluation objects may not be specifically classified by attributes. A name of an evaluation object is a character string for enabling users to identify the evaluation object, and indicates a content name in this embodiment.

The text database DB1 stores a text of any length entered by a user as a comment. In this embodiment, a user can freely enter a text, although a format may be determined to some extent. A length of a text may be freely determined, for example, at least one of the upper limit number of words and the lower limit number of words may be determined.

FIG. 6 is a diagram illustrating an example of data storage of the dictionary database DB2. As shown in FIG. 6, the dictionary database DB2 stores characteristic expressions. For example, the dictionary database DB2 stores a list of evaluation viewpoints $a_j$ and a list of evaluation expressions $e_k$. These lists may be stored in different databases. The content of the dictionary database DB2 may be edited by an administrator of the text extracting system 1.

The characteristic expression is referred to when extracting an input sentence, and is a reference to determine whether the input sentence is suitable for generating a question sentence, for example. The characteristic expression may be any predetermined expression indicating, for example, a user's thoughts and a feature (character) of an evaluation object in this embodiment. For example, the characteristic expression may include only one word, or a phrase including a plurality of words.

In this embodiment, a case will be described in which an evaluation expression $e_k$ corresponds to the characteristic expression. As such, in this embodiment, the description of "evaluation expression $e_k$" can be replaced with "characteristic expression." Instead of the evaluation expression $e_k$, an evaluation viewpoint $a_j$ may correspond to the characteristic expression. Alternatively, words and phrases specified by the administrator may correspond to the characteristic expression instead of using the evaluation expression $e_k$ and the evaluation viewpoint $a_j$ differently.

The characteristic expression is considered to change depending on an attribute of an evaluation object, and thus the dictionary database DB2 may be defined for each attribute. For example, if content belongs to the attribute of "comedy", expressions like "fun" and "funny" may be defined as the characteristic expressions, and if content belongs to the attribute of "horror", expressions like "scary" and "shocking" may be defined as the characteristic expressions.

FIG. 7 is a diagram illustrating an example of data storage of the question sentence database DB3. As shown in FIG. 7, the question sentence database DB3 stores question sentences generated by the question sentence generator. The question sentences that can easily elicit a user's thoughts can vary by attributes of content. As such, in this embodiment, the question sentence database DB3 stores question sentences per attribute of an evaluation object, although the question sentence database DB3 may store question sentences regardless of attributes. A question sentence stored in the question sentence database DB3 is displayed on a user terminal 20 at any time, and prompts the user to enter a comment.

The data stored in the data storage unit 100 is not limited to the above example. The data storage unit 100 may store an occurrence probability database in which occurrence probability of an opinion (a pair of evaluation viewpoint $a_j$ and evaluation expression $e_k$) is stored. In the occurrence probability database, the occurrence probability is calculated by summarizing appearance frequencies of opinions in texts and stored. The occurrence probability may be summarized by using texts stored in the text database DB1, or using other texts. The occurrence probability database may store not only occurrence probability of a pair of an evaluation viewpoint $a_j$ and an evaluation expression $e_k$, but also occurrence probability of only an evaluation viewpoint $a_j$, or occurrence probability of only an evaluation expression $e_k$.

[4-2. Text Obtaining Unit]

The text obtaining unit 101 obtains a plurality of texts. The texts obtained by the text obtaining unit 101 are a sentence set D, which amounts to a population. In this embodiment, texts are stored in the text database, and thus the text obtaining unit 101 refers to the text database DB1 to obtain a plurality of texts.

In this embodiment, the number of sentences included in a text is not limited to one, but may be freely determined by a user. As such, each of the texts obtained by the text obtaining unit 101 includes at least one sentence. The number of sentences included in a text may be the same as the number of sentences included in another text, or different from each other.

The text obtaining unit 101 may obtain all of the texts stored in the text database DB1, or may obtain some of the texts. The amount of texts obtained by the text obtaining unit 101 may not be specifically determined, or determined so as to be within a predetermined range.

The amount of texts may be represented in any indication, such as the total number of texts, the total number of sentences (individual sentences included in texts), the total number of characters, and total number of words. Further, the predetermined range may be either of an upper limit value or a lower limit value or a combination of both. For example, the text obtaining unit 101 obtains texts such that the total number of texts is within the predetermined range, or the total number of sentences is within the predetermined range. For example, the text obtaining unit 101 obtains texts such that the total number of characters is within the predetermined range, or the total number of words is within the predetermined range.

In this embodiment, the text obtaining unit 101 obtains a plurality of texts for each attribute in order to generate a question sentence corresponding to an attribute of content. The text obtaining unit 101 obtains a text associated with an attribute, for which a question sentence is to be generated, from the texts stored in the text database DB1. The attribute for which a question sentence is to be generated may be at least one of a plurality of attributes, and may be specified by the administrator of the text extracting system 1 or selected by a predetermined algorithm, for example.

[4-3. Specifying Unit]

The specifying unit 102 specifies at least one characteristic expression included in a plurality of texts. In this embodiment, the characteristic expression is defined in the dictionary database DB2, and thus the specifying unit 102 determines whether the texts obtained by the text obtaining unit 101 include the characteristic expression stored in the dictionary database DB2. In other words, the specifying unit 102 searches the texts obtained by the text obtaining unit 101 for the characteristic expression stored in the dictionary database DB2.

In this embodiment, all of the texts (whole of the plurality of texts) obtained by the text obtaining unit 101 are to be searched for the characteristic expression, although only some of the texts may be searched. For example, the specifying unit 102 searches the texts obtained by the text obtaining unit 101 using the characteristic expression stored in the dictionary database DB2 as a query. The exact match search of a character string may be performed, or ambiguous search may be performed.

If the texts obtained by the text obtaining unit 101 include a plurality of characteristic expressions, the specifying unit 102 specifies the plurality of characteristic expressions included in the plurality of texts. The specifying unit 102 may obtain a characteristic expression regardless of an attribute of a product, although in this embodiment, texts are obtained for each attribute, and thus the specifying unit 102 specifies at least one characteristic expression for each attribute.

In this embodiment, the specifying unit 102 specifies an opinion $<a_j, e_k>$, which is a pair of an evaluation viewpoint $a_j$ and an evaluation expression $e_k$ included in a text obtained by the text obtaining unit 101, based on the dictionary database DB2. For example, if an evaluation viewpoint $a_j$ and an evaluation expression $e_k$ are in the same sentence, the specifying unit 102 determines that there is an opinion $<a_j, e_k>$. If an evaluation viewpoint $a_j$ is not specifically used, the specifying unit 102 may specify only an evaluation expression $e_k$. If an evaluation expression $e_k$ is not specifically used, the specifying unit 102 may specify only an evaluation viewpoint $a_j$. If an evaluation viewpoint $a_j$ and an evaluation expression $e_k$ are not specifically distinguished from each other, the specifying unit 102 may specify, as the characteristic expression, words and phrases stored in the dictionary database DB2 from the texts obtained by the text obtaining unit 101.

[4-4. Extracting Unit]

The extracting unit 103 extracts, based on at least one characteristic expression specified by the specifying unit 102, at least one text to be entered into the question sentence generator, which generates a question sentence from an input sentence, from a plurality of texts. Here, to extract may also be described as to narrow down, select, or filter input sentences. In other words, it can be described that the extracting unit 103 creates a summary of a plurality of texts.

A unit of texts obtained by the text obtaining unit 101 and a unit of texts extracted by the extracting unit 103 may be the same or different from each other. For example, if at least one text is extracted from a plurality of texts, each of which includes only one sentence, the units of the texts before and after extraction are the same. On the other hand, if a plurality of sentences are respectively extracted from a plurality of texts each including a plurality of sentences, the units of the texts before and after extraction are different. That is, the unit of the text extracted by the extracting unit 103 is smaller than the unit of the text obtained by the text obtaining unit 101.

In this embodiment, each of one or more texts extracted by the extracting unit 103 is one of sentences included in a plurality of texts obtained by the text obtaining unit 101. That is, in this embodiment, a text to be extracted is an individual sentence. As such, in a case where a text includes a plurality of sentences, it may occur that all of the sentences are extracted, or some of the sentences are extracted and the others are not.

The extracting unit 103 may extract at least one text including the characteristic expression specified by the specifying unit 102. For example, the extracting unit 103 may extract all or only some of the texts including a certain characteristic expression. When extracting only some of the texts, the extracting unit 103 may preferentially extract a short-length text, or extract texts in a random manner. As another example, the extracting unit 103 may preferentially extract a text entered by a reliable user.

In this embodiment, the extracting unit 103 extracts at least one text such that an amount of text to be extracted is within the predetermined range. The predetermined range may be either of an upper limit value of the amount or a lower limit value of the amount or a combination of both. For example, as shown in the numerical expression 2, the extracting unit 103 extracts at least one text such that the total of lengths of the extracted texts is equal to or less than a threshold value $L_{max}$. The threshold value may be determined in advance, and variable by the administrator of the text extracting system 1, or defined for each attribute.

In a case where the specifying unit 102 has specified a plurality of characteristic expressions, the extracting unit 103 extracts at least one text such that more number of characteristic expressions are included in all of the extracted texts. That is, the extracting unit 103 extracts a text such that more number of characteristic expressions are included not in a specific text, but in all of the extracted texts. In this embodiment, a case will be explained in which the ILP based sentence extraction using the numerical expressions 1 to 10 is performed, thereby extracting a variety of texts including more number of expressions. However, other methods may also be used to extract a text such that more number of characteristic expressions are included.

For example, the extracting unit 103 may extract a text such that equal to or more than a predetermined number of characteristic expressions are included in the overall extracted texts. In this case, when extracting a text, the extracting unit 103 may use equal to or more than the predetermined number of characteristic expressions specified by the specifying unit 102, or may use equal to or more than a predetermined ratio of the characteristic expressions specified by the specifying unit 102. In other words, the extracting unit 103 may extract at least one text including each of the predetermined number or more of the characteristic expressions or each of the predetermined ratio or more of the characteristic expressions.

In a case where the specifying unit 102 has specified a plurality of characteristic expressions, the extracting unit 103 may use all of the specified characteristic expressions for text extraction, or may use only some of the specified characteristic expressions for text extraction. When using only some of the specified characteristic expressions for text extraction, the extracting unit 103 determines, based on a predetermined condition, at least one of a plurality of characteristic expressions to be used for text extraction, and extracts at least one text based on the determined at least one characteristic expression.

The predetermined condition is a condition for determining a characteristic expression to be used for text extraction, such as, maximizing the evaluation function of the numerical expression 4. This condition may be any predetermined condition instead of maximizing the evaluation function of the numerical expression 4, for example, setting the evaluation function of the numerical expression 4 to be equal to or more than a threshold value, or setting a value of another evaluation function to be maximized or equal to or more than the threshold value. As another example, the predetermined condition may be that the occurrence probability is equal to or more than a predetermined value, or that, with prioritizing characteristic expressions beforehand, a characteristic expression having higher priority is used.

For example, the extracting unit 103 obtains occurrence probability of at least one characteristic expression, and extracts at least one text based on the obtained occurrence probability. In this embodiment, the data storage unit 100 stores the occurrence probability in advance, and thus, the extracting unit 103 obtains the occurrence probability by referring to the data storage unit 100. The extracting unit 103 may calculate occurrence probability in the texts obtained by the text obtaining unit 101. In this case, the occurrence probability of a text is higher when the text appears more number of times in the texts obtained by the text obtaining unit 101.

The extracting unit 103 extracts at least one text such that a text having higher occurrence probability is preferentially extracted. In this embodiment, occurrence probability is defined as a weight of the evaluation function of the numerical expression 4, and the weight is increased as the occurrence probability is higher. The extracting unit 103 determines, based on the evaluation function of the numerical expression 4, a characteristic expression to be used for text extraction, and extracts a text including the determined expression.

The method for extracting a text using the occurrence probability is not limited to the example of this embodiment. For example, the extracting unit 103 may select the predetermined number of expressions in descending order of occurrence probabilities, and extract texts including the selected expressions. For example, the extracting unit 103 may select all or some of the expressions having occurrence probability equal to or more than the threshold value, and extract texts including the selected expressions.

For example, the extracting unit 103 obtains a dependency distance of at least one characteristic expression, and extracts at least one text based on the obtained dependency distance. In this embodiment, the average dependency distance in all of the texts is used, and thus the extracting unit 103 selects a plurality of texts including the characteristic expression from the texts obtained by the text obtaining unit 101, calculates dependency distances in the respective texts, and calculates an average value of the dependency distances. The dependency distance is proximity of an evaluation viewpoint $a_j$ to an evaluation expression $e_k$ in a sentence including these, and represented by the number of sentences or words. If there is only one text that includes the characteristic expression, a dependency distance in such a text is the average dependency distance.

The extracting unit 103 extracts at least one text such that a text having a shorter dependency distance is preferentially extracted. In this embodiment, the dependency distance is defined as a weight of the evaluation function of the numerical expression 4, and the weight is increased as the dependency distance is shorter. The extracting unit 103 determines, based on the evaluation function of the numerical expression 4, a characteristic expression to be used for text extraction, and extracts a text including the determined expression.

The method for extracting a text using the dependency distance is not limited to the example of this embodiment. For example, the extracting unit 103 may select the predetermined number of expressions in ascending order of dependency distances, and extract texts including the selected expressions. For example, the extracting unit 103 may select all or some of the expressions having the dependency distance equal to or less than the threshold value, and extract texts including the selected expressions.

For example, the extracting unit 103 extracts at least one text, in which at least one characteristic expression is included and the number of the characteristic expressions matches with the number of dependency words, from the plurality of texts. The dependency word is a word that relates to a characteristic expression, and an evaluation viewpoint $a_j$ in this embodiment. The words and phrases that can be the dependency words may be defined in the dictionary database DB2. The extracting unit 103 determines that an evaluation viewpoint $a_j$ relates to an evaluation expression $e_k$ when an evaluation viewpoint $a_j$ and an evaluation expression $e_k$ appear in one text. In this embodiment, based on the constraint expression indicated in the numerical expression 5, even if a text includes a characteristic expression, the extracting unit 103 does not extract the text if the text does not include a dependency word or the number of the characteristic expressions does not match with the number of the dependency words. For example, when a text includes two evaluation viewpoints and one evaluation expression, the text is not extracted because the numbers do not match.

For example, the extracting unit 103 extracts at least one text, in which at least one characteristic expression is included and the number of dependency words of the characteristic expression is within a predetermined range, from the plurality of texts. The predetermined range may be any range determined in advance, and at least one of the upper limit number or the lower limit number is determined. In this embodiment, as shown in the numerical expression 6, the extracting unit 103 extracts a text including equal to or less than one dependency word, although the predetermined range may not be limited to equal to or less than one but may be any range, for example, equal to or less than two, or equal to or less than three.

For example, the extracting unit 103 extracts at least one text, in which at least one characteristic expression is included and the number of the characteristic expressions is within a predetermined range, from the plurality of texts.

The predetermined range may be any range that is determined in advance, and at least one of the upper limit number or the lower limit number is determined. In this embodiment, as shown in the numerical expression 7, the extracting unit 103 extracts a text including equal to or less than one characteristic expression, although the predetermined range may not be limited to equal to or less than one but may be any range, such as equal to or less than two, or equal to or less than three.

In this embodiment, at least one text is extracted such that the number of texts including the same expression in the extracted texts is within the predetermined range. The predetermined range may be any range that is determined in advance, and at least one of the upper limit number or the lower limit number is determined. That is, the extracting unit 103 extracts texts in a manner to avoid that equal to or more than a predetermined number of texts including a certain expression are redundantly extracted. For example, for every opinion $<a_j, e_k>$ used for extracting an input sentence, the extracting unit 103 extracts texts so that the number of texts including an opinion $<a_j, e_k>$ is within a predetermined range. As such, a large number of texts including the same opinion $<a_j, e_k>$ are not extracted. In this embodiment, only one text including the same expression is extracted, although any number of texts, such as two or three texts, may be extracted.

In this embodiment, an attribute for which a question sentence is generated is specified, and thus the extracting unit 103 extracts at least one text from a plurality of texts for each attribute. The extracting unit 103 extracts an input sentence of an attribute, for which a question sentence is generated, from texts associated with such an attribute.

[4-5. Input Unit]

The input unit 104 inputs at least one text, which is extracted by the extracting unit 103, into the question sentence generator. For example, in a case of a question sentence generator using machine translation, the input unit 104 calculates a feature amount (feature vector) of a text, and inputs the calculated feature amount into the question sentence generator. The question sentence generator outputs a question sentence based on the feature amount of the text. If the question sentence generator has an algorithm for calculating a feature amount, the input unit 104 may simply input a character string indicated in the text into the question sentence generator, and the question sentence generator may calculate a feature amount by itself and output a question sentence.

For example, if a rule-based or a semi-rule-based question sentence generator is used, the input unit 104 simply inputs a character string indicated in the text into the question sentence generator, and the question sentence generator converts the character string into a question sentence based on a predetermined conversion rule. For example, in a case of a question sentence generator using a template, the input unit 104 simply inputs a character string indicated in the text into the question sentence generator, and the question sentence generator uses the template to output a question sentence.

[4-6. Question Sentence Obtaining Unit]

The question sentence obtaining unit 105 obtains at least one question sentence generated by the question sentence generator. The question sentence obtaining unit 105 obtains an output of the question sentence generator, and stores the output in the question sentence database DB3. In this embodiment, an attribute for which a question sentence is generated is specified, and thus the question sentence obtaining unit 105 stores the question sentence in the question sentence database DB3 in association with the attribute. The question sentence associated with the attribute is output to a user to whom an evaluation object of the attribute is provided.

[4-7. Question Sentence Outputting Unit]

Figure 8:
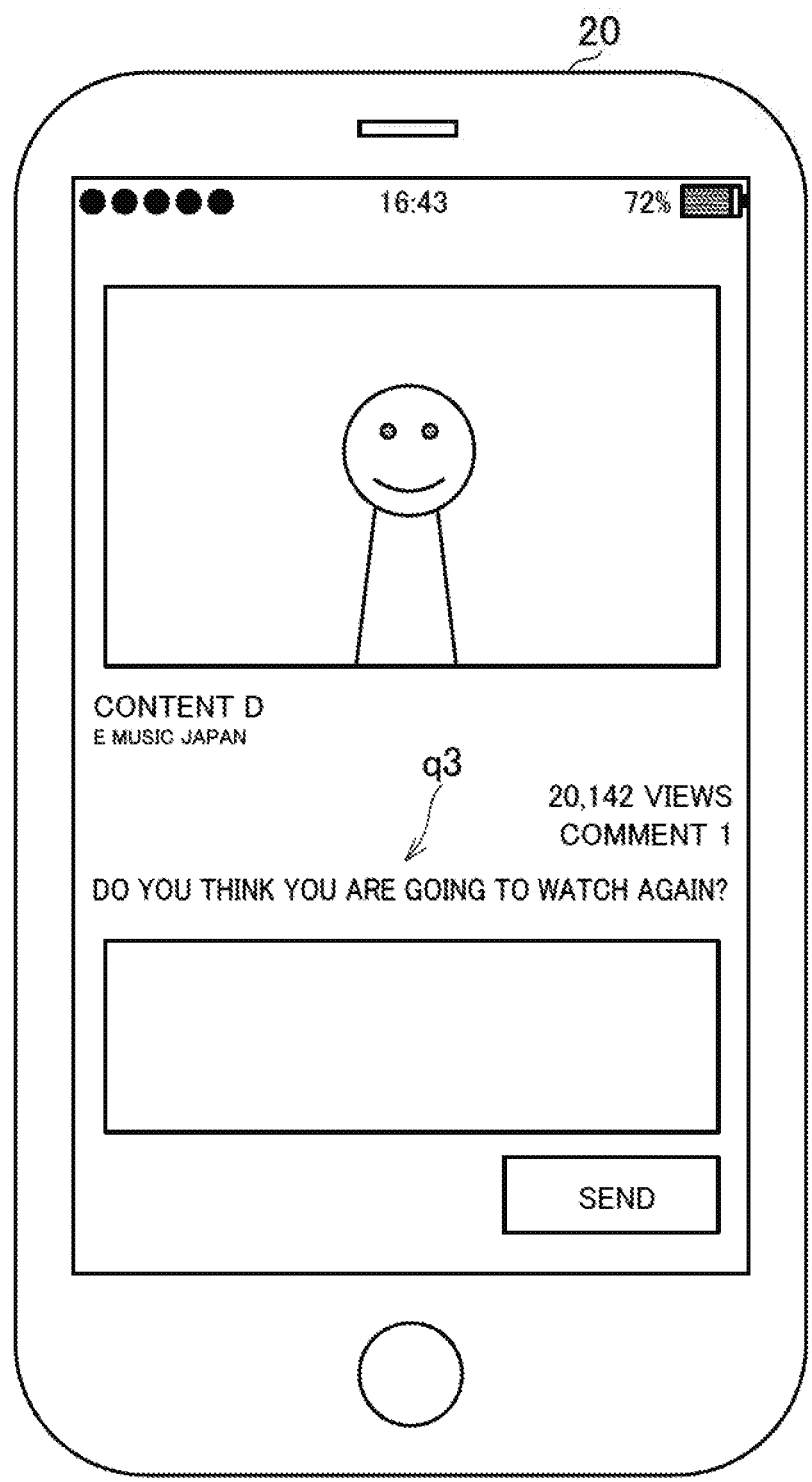
FIG. 8 is a diagram showing how a question sentence is output.

The question sentence outputting unit 106 outputs a question sentence based on the question sentence database DB3. FIG. 8 is a diagram showing how a question sentence is output. As shown in FIG. 8, for example, the question sentence outputting unit 106 displays a question sentence q3 stored in the question sentence database DB3 on the user terminal 20 so as to prompt the user to enter a comment. In this embodiment, the question sentence outputting unit 106 outputs a question sentence to a user who has not entered a text, although a question sentence may be output to a user who has entered a text. The question sentence outputting unit 106 outputs a question sentence associated with an attribute of the content displayed on the user terminal 20. In a case where a plurality of question sentences are generated, the question sentence outputting unit 106 may output any question sentence in a random manner, or output a question sentence including an expression having high occurrence probability.

[5. Processing Executed in This Embodiment]

Figure 9:
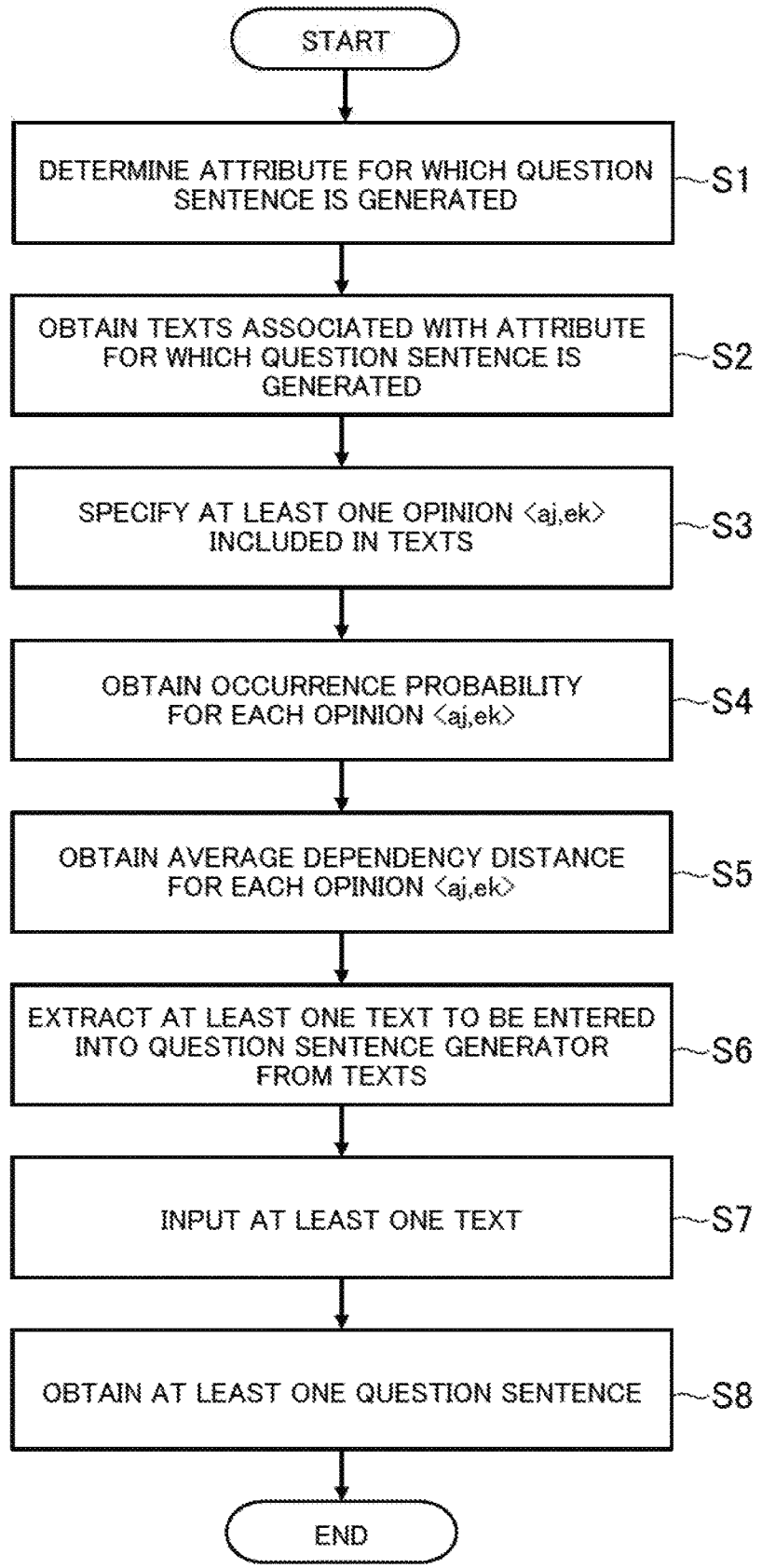
FIG. 9 is a flow chart showing an example of processing executed in a server.

FIG. 9 is a flow chart showing an example of processing executed in the server 10. The processing shown in FIG. 9 is executed when the control unit 11 operates in accordance with the program stored in the storage unit 12. The processing described in FIG. 9 is an example of the processing executed by the functional block shown in FIG. 4.

As shown in FIG. 9, the control unit 11 determines an attribute for which a question sentence is to be generated (S1). In S1, the control unit 11 determines at least one of a plurality of attributes prepared in advance as an attribute for which a question sentence is generated. As described above, the attribute for which a question sentence is generated may be specified by the administrator or determined based on an algorithm.

The control unit 11 refers to the text database DB1 stored in the storage unit 12, and obtains a plurality of texts associated with the attribute for which a question sentence is generated (S2). In S2, the control unit 11 obtains a text, which is stored in the text database DB1 and entered with respect to an evaluation object of the attribute for which a question sentence is generated, as a population of input sentence extraction.

The control unit 11 specifies at least one opinion $<a_j, e_k>$ included in the plurality of texts obtained in S2 based on the dictionary data (S3). In S3, the control unit uses an evaluation viewpoint $a_j$ and an evaluation expression $e_k$ stored in the dictionary data as a query, and searches the texts obtained in S2 to specify the opinion $<a_j, e_k>$.

The control unit 11 obtains occurrence probability for each opinion $<a_j, e_k>$ specified in S3 based on the occurrence probability database (S4). The occurrence probability database stores occurrence probability for each opinion $<a_j, e_k>$. In S4, the control unit 11 obtains occurrence probability associated with each opinion $<a_j, e_k>$.

The control unit 11 obtains an average dependency distance for each opinion $<a_j, e_k>$ specified in S2 (S5). In S5, for each opinion $<a_j, e_k>$, the control unit 11 specifies a text including such an opinion $<a_j, e_k>$, calculates a distance between an evaluation viewpoint $a_j$ and an evaluation expression $e_k$ in the specified text, and calculates an average value of the distances.

The control unit 11 extracts, based on the occurrence probability, the average dependency distance, and the ILP based sentence extraction in the numerical expression 1 to the numerical expression 10, at least one text to be entered into the question sentence generator from the texts obtained in S1 (S6). The details of the processing in S6 are as described in [3. An example of a method of extracting input sentence].

The control unit 11 inputs at least one text extracted in S6 into the question sentence generator (S7). If a plurality of texts are extracted in S6, the control unit 11 individually inputs the texts in the question sentence generator in S7.

The control unit 11 obtains at least one question sentence that is output from the question sentence generator (S8), and the processing terminates. In S8, the control unit 11 stores a question sentence, which is output from the question sentence generator, in the question sentence database DB3 in association with the attribute determined in S1. The question sentence stored in the question sentence database DB3 is displayed on the user terminal 20 at any time. For example, a question sentence associated with an attribute of content viewed by a user is displayed on the user terminal 20, and prompts the user to enter a comment on the content.

According to the above described text extracting system 1, at least one text to be entered into the question sentence generator is extracted from a plurality of texts based on at least one characteristic expression included in the plurality of texts. This prevents a text that does not include a characteristic expression from being entered into the question sentence generator, and an unwanted question sentence, such as a question sentence that is unclear about what is asked, a question sentence that does not look correct, and a question sentence that cannot elicit a user's thoughts, from being generated. This configuration can improve accuracy of a question sentence to be generated by the question sentence generator. For example, in a case where a text that does not include a characteristic expression is entered into the question sentence generator, unnecessary processing for generating an unwanted question sentence may be performed and thereby increasing the processing load on the computer that executes the question sentence generator. In this regard, a text that does not include a characteristic expression is not entered into the question sentence generator, and thus unnecessary processing is not performed. This can reduce the processing load on the computer described above. Further, in a case where an unwanted question sentence is generated, memory consumption of a memory that stores question sentences is increased due to the unwanted question sentence. By generating only a highly accurate question sentence, the memory consumption can be reduced. Further, in a case where a text suitable for generating a question sentence is manually extracted by a user from a plurality of texts, a lot of time and effort may be needed. In this regard, if a text is extracted based on characteristic expressions included in a plurality of texts, the user's time and effort can be reduced. In a case where a question sentence generated by the question sentence generator is presented to a user so as to ask for an answer, the accuracy of the presented question sentence is increased. This can reduce time and effort of the user who answers the question sentence. That is, in an attempt to obtain useful information from the user, the number of times the user inputs answers can be reduced.

The text extracting system 1 stores the program of the question sentence generator and generates a question sentence by itself. In this manner, the text extracting system 1 can obtain the question sentence. As described above, it is possible to reduce the processing load on the computer that operates the question sentence generator and suppress the memory consumption. As such, the processing load on the text extracting system 1 and the memory consumption can be reduced by implementing the question sentence generator in the text extracting system 1.

At least one text is extracted such that more number of characteristic expressions are included in the extracted text. In this manner, a text having a variety of expressions can be extracted, which effectively improves accuracy of a question sentence. For example, in a case where a text is not extracted in a manner that more number of characteristic expressions are included, when five texts are output and include five opinions, there may be a case where the first text includes three opinions, the second text includes two opinions, and the other texts include no opinion. In this regard, the text extracting system 1 enables each of the five texts to equally include one opinion, which serves to increase expression variations of input sentences.

A plurality of texts include various types of characteristic expressions. Some expressions are suitable for generating a question sentence, and some expressions are not. The text extracting system 1 determines at least one characteristic expression to use from a plurality of characteristic expressions included in a plurality of texts, and then extracts at least one text. As such, an expression suitable for generating a question sentence can be used, and accuracy of the question sentence can be effectively increased. Further, the characteristic expressions to be used are narrowed down, and input sentences to be entered into the question sentence generator are thus narrowed down to those capable of providing highly accurate question sentences. This eliminates the need of executing unnecessary processing to obtain inaccurate question sentences, and serves to effectively reduce the processing load. Only highly accurate question sentences are obtained from the question sentence generator, and thus the extra memory area for storing inaccurate question sentences is not required. As such, it is possible to effectively suppress memory consumption.

At least one text is extracted such that an amount of texts to be extracted is within a predetermined range. This serves to narrow down the texts to those capable of providing highly accurate question sentences, and effectively improve the accuracy of the question sentences. Further, an amount of texts to be entered into the question sentence generator is reduced so that the question sentence generator outputs highly accurate question sentence with less amount of processing. This can effectively reduce the processing load. Further, an amount of texts to be entered into the question sentence generator is reduced so that an amount of question sentences to be output from the question sentence generator is also reduced. This can effectively suppress memory consumption.

At least one text is extracted based on occurrence probability of at least one characteristic expression included in a plurality of texts. With this configuration, a text including a more regular expression can be entered into the question sentence generator, and thus a more comprehensive, highly accurate question sentence can be obtained. Further, the texts are narrowed down using the occurrence probability, and this serves to prevent the question sentence generator from executing unnecessary processing. This also serves to effectively reduce the processing load, reduce the number of question sentences output from the question sentence generator, and effectively suppress memory consumption.

At least one text is extracted based on a dependency distance of at least one characteristic expression included in a plurality of texts. With this configuration, a comprehensive text in which a distance between a characteristic expression and a dependency word is considered can be entered into the question sentence generator, and thus a more comprehensive, highly accurate question sentence can be obtained. Further, the texts are narrowed down using the dependency distance, and this serves to prevent the question sentence generator from executing unnecessary processing. This also serves to effectively reduce the processing load, reduce the number of question sentences output from the question sentence generator, and effectively suppress memory consumption.

At least one text is extracted based on a dependency distance of at least one characteristic expression included in a plurality of texts. With this configuration, a comprehensive text in which a distance between a characteristic expression and a dependency word is considered can be entered into the question sentence generator, and thus a more comprehensive, highly accurate question sentence can be thereby obtained. Further, the texts are narrowed down using the correspondence between the number of characteristic expressions and the number of dependency words, and this serves to prevent the question sentence generator from executing unnecessary processing. This also serves to effectively reduce the processing load, reduce the number of question sentences output from the question sentence generator, and effectively suppress memory consumption.

At least one text including at least one characteristic expression included in a plurality of texts is extracted, where the number of dependency words of the characteristic expression is within the predetermined range. With this configuration, a comprehensive text in which the number of dependency words is considered can be entered into the question sentence generator, and thus a more comprehensive, highly accurate question sentence can be obtained. Further, the texts are narrowed down using the number of dependency words, and this serves to prevent the question sentence generator from executing unnecessary processing. This also serves to effectively reduce the processing load, reduce the number of question sentences output from the question sentence generator, and effectively suppress memory consumption. For example, in a case where a text including equal to or less than one dependency word is extracted, a redundant text like the comment s3 in FIG. 2 can be eliminated. As such, a simpler text that is easily converted into a question sentence can be extracted, and this effectively improves accuracy of a question sentence.

At least one text including at least one characteristic expression included in a plurality of texts is extracted, where the number of characteristic expressions is within the predetermined range. With this configuration, a comprehensive text in which the number of characteristic expressions is considered can be entered into the question sentence generator, and thus a more comprehensive, highly accurate question sentence can be obtained. Further, the texts are narrowed down using the number of characteristic expressions, and this serves to prevent the question sentence generator from executing unnecessary processing. This also serves to effectively reduce the processing load, reduce the number of question sentences output from the question sentence generator, and effectively suppress memory consumption. For example, in a case where a text including equal to or less than one characteristic expression is extracted, a redundant text like the comment s3 in FIG. 2 can be eliminated. As such, a simpler text that is easily converted into a question sentence can be extracted, and this effectively improves accuracy of a question sentence.

At least one text is extracted such that the number of texts including the same expression in the extracted texts is within the predetermined range. This prevents a lot of similar texts from being entered into the question sentence generator and a lot of similar question sentences from being output. In this manner, it is possible to prevent the question sentence generator from executing unnecessary processing to generate a lot of similar question sentences, and this serves to effectively reduce the processing load, reduce the number of question sentences output from the question sentence generator, and effectively suppress memory consumption.

Each of the extracted texts is any one of sentences included in a plurality of texts, and each sentence is a unit of extraction. With this configuration, even if a text includes a plurality of sentences, the text can be entered into the question sentence generator by sentences, which are easier to generate question sentences. This effectively improves the accuracy of the question sentences.

[6. Variations]

The present invention is not to be limited to the above described embodiment. The present invention can be changed as appropriate without departing from the spirit of the invention.

For example, in the embodiment, a comment on content is taken as an example of a text, although the text may be a review of an evaluation object. In this case, the evaluation object is a product, service, or content. The review is a user's subjective thoughts, and also called word-of-mouth information. The review may be entered by a user who has used or purchased the evaluation object, or a user who is considering purchasing the evaluation object.

The product is not limited to tangible goods dealt in shops on the Internet or actual shops, but may be tours, financial instruments, or data such as applications and music. The service may be any service, such as accommodation service, food and beverage serving service, insurance service, and financial service. The content may be any content, such as an article on a web site, SNS posting, message board posting, video, music, and an application such as a game.

In the variation, the text database stores user's reviews of products, for example. In the variation, the characteristic expressions stored in the dictionary database indicate features of evaluation objects, such as quality, performance, taste, flavor, atmosphere, and appearance. The question sentence generated by the question sentence generator is a text that prompts a user to enter a review.

Similarly to the embodiment, an evaluation object belongs to at least one of a plurality of attributes, although an attribute may not be present. In the variation, the text obtaining unit 101 obtains a plurality of reviews for each attribute. The specifying unit 102 specifies at least one characteristic expression for each attribute. The extracting unit 103 extracts at least one text for each attribute from the plurality of reviews. These processes may be performed by replacing the descriptions "text" or "comment" in the embodiment with "review."

In the variation, a feature of an evaluation object included in a plurality of reviews of the evaluation object is specified, and a review to be entered into the question sentence generator is extracted from the reviews. This improves accuracy of generating a question sentence to prompt a user to enter a review. The number of reviews can be thereby increased, which serves to provide useful information.

At least one text is extracted from a plurality of texts for each attribute of an evaluation object, and thus a highly accurate question sentence corresponding to an attribute can be generated. For example, a question sentence corresponding to a category or a genre of a product is generated, which provides a user with a stronger motivation to enter a review.

In the embodiment, the case has been described in which the text extracting system 1 is used for generating a question sentence, although the text extracting system 1 may be used in a case other than generating a question sentence. That is, the configuration of generating a question sentence may be omitted from the above described configurations. For example, the text extracting system 1 may be used for generating a summary, and may generate a summary using the ILP based sentence extraction described in the embodiment. In this case, the text extracting system 1 may extract at least one text and generate a summary such that more number of characteristic expressions are included in the summary.

For example, the text extracting system 1 may narrow down a plurality of characteristic expressions under a predetermined condition, and then extract a text to generate a summary. For example, the text extracting system 1 may omit the constraint expressions of the numerical expression 5 and the subsequent expressions, and generate a summary using only the evaluation function indicated in the numerical expression 4. In this case, the text extracting system 1 may extract, based on the occurrence probability or based on the dependency distance, a text to generate a summary.

For example, the text extracting system 1 may generate a summary considering only the constraint expression indicated in the numerical expression 5. In this case, the text extracting system 1 may extract a text in which the number of evaluation viewpoints $a_j$ is the same as the number of evaluation expressions $e_k$ as a text to generate a summary. For example, the text extracting system 1 may generate a summary by considering only the constraint expression in the numerical expression 6 or the numerical expression 7. In this case, the text extracting system 1 may extract a text including equal to or less than one evaluation viewpoint $a_j$ as a text to generate a summary, or a text including equal to or less than one evaluation expression $e_k$ as a text to generate a summary.

Besides generating a summary, the text extracting system 1 may be used for aggregating comments or reviews, or extracting an input sentence to be entered into a translator. For example, the text extracting system 1 may be used for generating Q & A or FAQ. For example, the text extracting system 1 may convert sentences for generating chats by Chabot, or for creating examination questions. For example, when being used for Chabot, the text extracting system 1 generates a question sentence indicating a chat of Chabot. For example, when being used for creating examination questions, the text extracting system 1 generates questions based on answers to the examination questions.

For example, text extracting system 1 may be used for extracting a text to be entered into a converter that converts a question sentence into a declarative sentence, extracting a text to be entered into a converter that converts a declarative sentence into an imperative sentence, extracting a text to be entered into a converter that converts a declarative sentence into an exclamatory sentence, or extracting a text to be entered into a converter that converts an exclamatory sentence into a declarative sentence. As another example, the text extracting system 1 may be used for extracting a text to be entered into a converter that converts a sentence in a dialect used in an area into a sentence in a dialect used in another area in the same language (same country).

For example, the case has been described in which the functions are implemented in the server 10, although the functions may be shared among a plurality of computers. For example, the functions may be shared between the server 10 and the user terminal 20, or shared among a plurality of server computers. In this case, the functions may be shared by sending and receiving the processing results through the network N. For example, the data described as being stored in the data storage unit 100 may be stored in a computer other than the server 10.

The invention claimed is:

1. A text extracting system comprising at least one processor configured to:
   obtain a plurality of texts associated with an evaluation object;
   specify at least one characteristic expression included in the plurality of texts;
      wherein the characteristic expression indicates an evaluation viewpoint indicating an attribute of the evaluation object and/or an evaluation expression indicating an opinion of the evaluation object; and
   extract, based on the at least one characteristic expression, at least one text entered into a question sentence generator from the plurality of texts, the question sentence generator generating a question sentence from an input sentence via a neural machine or a statistical machine or a rule-based method;
   wherein the processor is configured to extract the at least one text based on an evaluation function defined by the product of a set of evaluation viewpoints, a set of evaluation expressions, and the presence and weight of an opinion;
   wherein the weight of the opinion is calculated as an occurrence probability of the opinion divided by the average dependency distance between the evaluation viewpoint and the evaluation expression of the opinion.

2. The text extracting system according to claim 1, further comprising a memory that stores the question sentence generator, wherein
   the at least one processor is further configured to:
   input the at least one text in the question sentence generator, and
   obtain at least one question sentence generated by the question sentence generator.

3. The text extracting system according to claim 1, wherein
   the at least one processor is further configured to:
   specify a plurality of characteristic expressions included in the plurality of texts; and
   extract the at least one text in such a way that at least two characteristic expressions are included in the extracted texts.

4. The text extracting system according to claim 1, wherein the at least one processor is further configured to:
   specify a plurality of characteristic expressions included in the plurality of texts;
   determine, based on a predetermined condition, at least one characteristic expression to be used for text extraction from the plurality of characteristic expressions; and
   extract the at least one text including the at least one determined characteristic expression.

5. The text extracting system according to claim 1, wherein the at least one processor is further configured to extract the at least one text in such a way that an amount of the text to be extracted is within a predetermined range.

6. The text extracting system according to claim 1, wherein the at least one processor is further configured to:
   obtain an occurrence probability of the at least one characteristic expression; and
   extract the at least one text based on the occurrence probability.

7. The text extracting system according to claim 1, wherein the at least one processor is further configured to:
obtain a dependency distance of the at least one characteristic expression; and
extract the at least one text based on the dependency distance.

8. The text extracting system according to claim 1, wherein the at least one processor is further configured to extract, from the plurality of texts, at least one text which includes the at least one characteristic expression, and in which a number of the at least one characteristic expression matches with a number of at least one dependency word.

9. The text extracting system according to claim 1, wherein the at least one processor is further configured to extract, from the plurality of texts, at least one text which includes the at least one characteristic expression, and in which a number of at least one dependency word of the at least one characteristic expression is within a predetermined range.

10. The text extracting system according to claim 1, wherein the at least one processor is further configured to extract, from the plurality of texts, at least one text which includes the at least one characteristic expression, and in which a number of the at least one characteristic expression is within a predetermined range.

11. The text extracting system according to claim 1, wherein the at least one processor is further configured to extract the at least one text in such a way that a number of the extracted texts that include a same characteristic expression is within a predetermined range.

12. The text extracting system according to claim 1, wherein
each of the plurality of texts is a review of the evaluation object,
the at least one characteristic expression indicates a feature of the evaluation object, and
the question sentence is a text that prompts a user to input a review.

13. The text extracting system according to claim 12, wherein
the evaluation object belongs to at least one of a plurality of attributes, and
the at least one processor is further configured to:
obtain a plurality of reviews for each of the plurality of attributes,
specify at least one characteristic expression for each of the plurality of attributes, and
extract at least one review from the plurality of reviews for each of the plurality of attributes.

14. The text extracting system according to claim 1, wherein
each of the plurality of texts to be obtained includes at least one sentence, and
each of the at least one text to be extracted is any one of the sentences included in the plurality of texts.

15. A text extracting method, comprising:
obtaining a plurality of texts associated with an evaluation object;
specifying at least one characteristic expression included in the plurality of texts;
wherein the characteristic expression indicates an evaluation viewpoint indicating an attribute of the evaluation object and/or an evaluation expression indicating an opinion of the evaluation object; and
extracting, based on the at least one characteristic expression, at least one text entered into a question sentence generator from the plurality of texts, the question sentence generator generating a question sentence from an input sentence via a neural machine or a statistical machine or a rule-based method;
extracting the at least one text based on an evaluation function defined by the product of a set of evaluation viewpoints, a set of evaluation expressions, and the presence and weight of an opinion;
wherein the weight of the opinion is calculated as an occurrence probability of the opinion divided by the average dependency distance between the evaluation viewpoint and the evaluation expression of the opinion.

16. A non-transitory information storage medium storing a program that causes a computer to:
obtain a plurality of texts associated with an evaluation object;
specify at least one characteristic expression included in the plurality of texts;
wherein the characteristic expression indicates an evaluation viewpoint indicating an attribute of the evaluation object and/or an evaluation expression indicating an opinion of the evaluation object; and
extract, based on the at least one characteristic expression, at least one text entered into a question sentence generator from the plurality of texts, the question sentence generator generating a question sentence from an input sentence via a neural machine or a statistical machine or a rule-based method;
extract the at least one text based on an evaluation function defined by the product of a set of evaluation viewpoints, a set of evaluation expressions, and the presence and weight of an opinion;
wherein the weight of the opinion is calculated as an occurrence probability of the opinion divided by the average dependency distance between the evaluation viewpoint and the evaluation expression of the opinion.

17. The text extracting system according to claim 1, wherein the characteristic expression indicates the evaluation viewpoint and the evaluation expression.

18. The text extracting system according to claim 6, wherein the occurrence probability is predetermined or obtained by analyzing the plurality of texts statistically.

19. The text extracting system according to claim 7, wherein the dependency distance is a value representing the distance between an evaluation viewpoint and an evaluation expression.

* * * * *